Nov. 18, 1952 — J. R. OLIVER — 2,618,696
APPARATUS FOR USE IN TRANSMITTING ANGULAR MOVEMENT
Filed Jan. 20, 1945 — 7 Sheets-Sheet 1

Fig.1

Inventor
John R. Oliver
By his Attorney

Nov. 18, 1952        J. R. OLIVER        2,618,696
APPARATUS FOR USE IN TRANSMITTING ANGULAR MOVEMENT
Filed Jan. 20, 1945        7 Sheets-Sheet 4

*Inventor*
John R. Oliver
By his Attorney

Nov. 18, 1952    J. R. OLIVER    2,618,696
APPARATUS FOR USE IN TRANSMITTING ANGULAR MOVEMENT
Filed Jan. 20, 1945    7 Sheets-Sheet 5

Inventor
John R. Oliver
By his Attorney

Nov. 18, 1952  J. R. OLIVER  2,618,696
APPARATUS FOR USE IN TRANSMITTING ANGULAR MOVEMENT
Filed Jan. 20, 1945  7 Sheets-Sheet 6

Inventor
John R. Oliver
By his Attorney

Patented Nov. 18, 1952

2,618,696

UNITED STATES PATENT OFFICE 2,618,696

APPARATUS FOR USE IN TRANSMITTING ANGULAR MOVEMENT

John R. Oliver, Beverly, Mass., assignor to United Shoe Machinery Corporation, Flemington, N. J., a corporation of New Jersey Application January 20, 1945, Serial No. 573,799

3 Claims. (Cl. 177—337)

This invention relates to apparatus for use in transmitting angular movement and is herein illustrated in its application to a pelorus combined with an electrical system for the transmission of angular movement. Such a system is disclosed in United States Letters Patent No. 1,612,117, granted December 28, 1926, on a application filed in the name of Hewlett et al. This patent discloses a system commonly known as the "selsyn system" and is characterized by transmitting and receiving devices each provided with a single phase or single circuit field winding and a polyphase or polycircuit armature winding, the armature windings being interconnected. Such a system is self-synchronous and may be employed to transmit angular movements, such as the movement of a sight mount or pelorus, from an observing station to an indicating instrument in a control room.

The invention is herein illustrated as embodied in an apparatus for use in submarines to obtain relative bearings, or more specifically to determine the angular relation between the lubber line of the submarine and the line of sight of the observer on a sighted object or target. The observing station is located on the deck of the submarine where the apparatus is exposed to the elements and consequently the parts which would be adversely affected by immersion in salt water must be suitably enclosed, and it is an object of the present invention to provide the necessary closures or housings for adapting the apparatus to use on the deck of the submarine.

With the above object in view the invention comprises apparatus which consists of a rotor which, in the illustrated organization, provides a mounting for a sighting means for obtaining a relative bearing, said rotor having formed therein a closure in which a rotary dial is mounted. A hub extending from the rotor is mounted in bearings in a closure which contains an electric motor, said motor in the illustrated organization being an element of a selsyn system through which the dial is operated. The dial is provided with a stem extending through an opening in the hub and into the closure which mounts the motor and operating connections are provided from the motor to the stem. Both the rotor which mounts the dial and the rotor which mounts the motor are constructed to exclude water under pressure in order to protect said instrumentalities when the illustrated apparatus is mounted on the deck of a submarine.

In accordance with a further feature of the invention an electric generator, which in the illustrated organization forms an element of a selsyn system, is mounted in the closure in which the motor operates and is operated by the angular movement of the rotor through operating connections from the hub of the rotor to the generator.

These and other features of the invention will now be described with reference to the accompanying drawings and pointed out in the appended claims.

Figure 1:
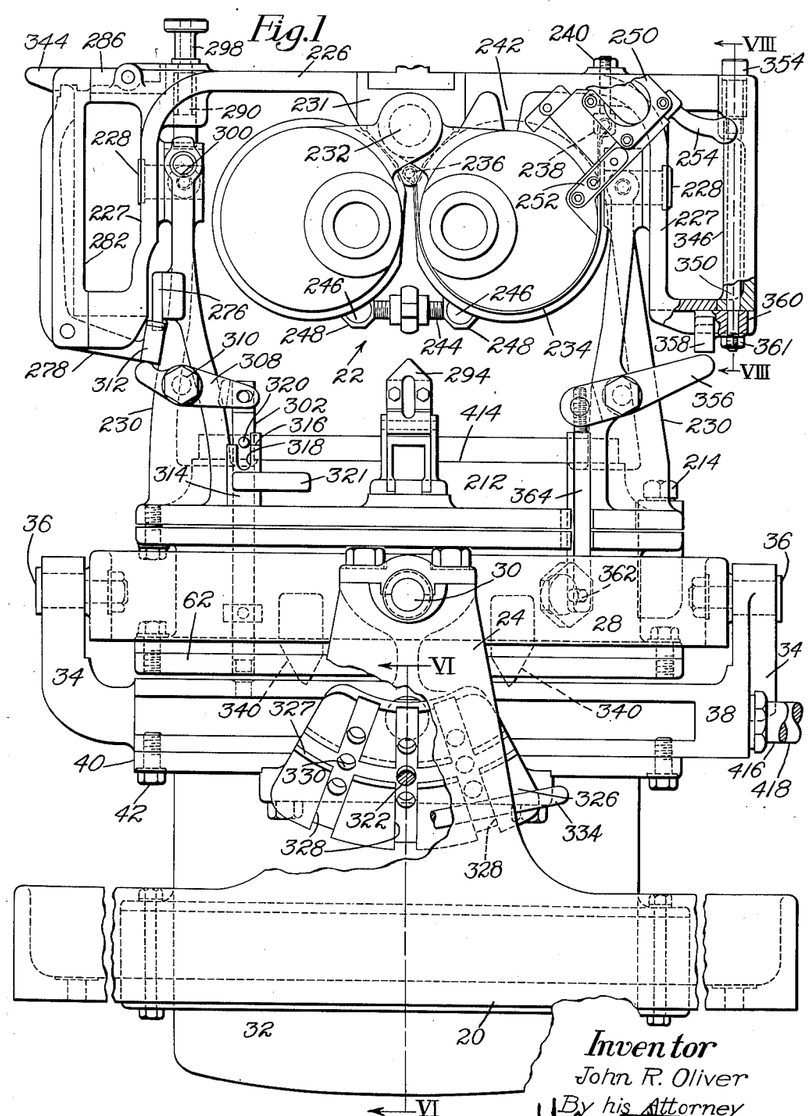
Fig. 1 is a front elevation illustrating apparatus embodying the features of the present invention, with certain parts broken away and other parts shown in section.

In Fig. 1 there is illustrated apparatus embodying the features of the present invention, said apparatus being shown in elevation as seen from the observer's station on the deck of the submarine. The illustrated assembly is supported in a circular frame 20 secured to a rigid portion of the superstructure of the submarine and so arranged that a sighting instrument, herein illustrated as a pair of binoculars 22, is arranged at approximately the eye level of the observer. Inasmuch as the deck installations in the central portion of the submarine make it impracticable to provide a single observation station from which the entire horizon may be viewed I prefer to provide two such stations located respectively fore and aft of the conning tower.

The frame 20 is in the form of a flanged ring arranged horizontally on the superstructure of the submarine and having upward extensions 24 at opposite sides thereof which provide bearings for a gimbal mechanism in which the illustrated apparatus is suspended. The gimbal mechanism comprises a ring 28 having outwardly projecting trunnion pins 20 journaled in bearings in the upper portion of the standard. The gimbal ring 28 provides a mounting for a housing 32, said housing having outwardly and upwardly extending arms 34 pivotally mounted on suitable bolts 36 projecting outwardly from the gimbal ring 28 at points angularly spaced 90° from the bearings of the gimbal ring in the standard. The housing 32 provides a watertight closure for two synchronous generators which are actuated by movements of the binocular mount in azimuth. For actuating said generators the binocular mount or pelorus has a downwardly extending hub, hereinafter more fully described, said hub being so geared to said generators that one of the generators rotates on a 1:1 ratio with the binocular mount while the other rotates on a 36:1 ratio. The two synchronous generators are electrically connected to two synchronous motors located in the control room of the submarine and arranged to operate two dials which record the angular position of the line of sight of the binoculars relatively to the longitudinal center line or lubber line of the submarine. The 1:1 dial records the binocular bearing in degrees while the 36:1 dial is graduated to read in minutes. The synchronous generator and motor system above briefly described is of a type commonly employed in "selsyn" systems for transmitting angular motion and is therefore not described in detail herein. A detailed description of such a system will be found in the Hewlett et al. patent hereinbefore referred to.

In addition to the pelorus and the "selsyn" system above described for transmitting to the control room the angular movement of the pelorus, means is provided in the base of the pelorus within the range of vision of the observer for obtaining a compass bearing. While any suitable means may be provided for this purpose I prefer to employ means operated by a gyrocompass located below decks. The angular movements of the gyrocompass are transmitted to the indicating means in the pelorus by means of a "selsyn" system substantially the same as that briefly described above. This system comprises two synchronous generators actuated by the gyrocompass and electrically connected to two synchronous motors contained within the housing 32 and suitably geared to dials mounted in the pelorus. As in the "selsyn" system above described the synchronous generators operated by the gyrocompass are geared to rotate on 1:1 and 36:1 ratios, respectively. The weight of the two synchronous generators and the two synchronous motors enclosed in the housing 32 is such that the center of gravity of the assembly suspended by the gimbals is well below the trunnion pins 30, thus maintaining the arrangement of the apparatus illustrated in Fig. 1 with the binoculars 22 located above the trunnion pins. The illustrated gimbal mechanism not only performs the usual function of permitting freedom of movement of the suspended apparatus about two horizontal axes arranged at right angles to each other but also serves in conjunction with the standard 20 to hold the housing 32 and the parts secured therein against movement about an axis extending heightwise of the housing. Thus it will be seen that the synchronous motors and generators contained within the housing are held against rotary movement about the axis of the pelorus and consequently receive their actuation solely from the angular movement of the pelorus.

Figure 2:
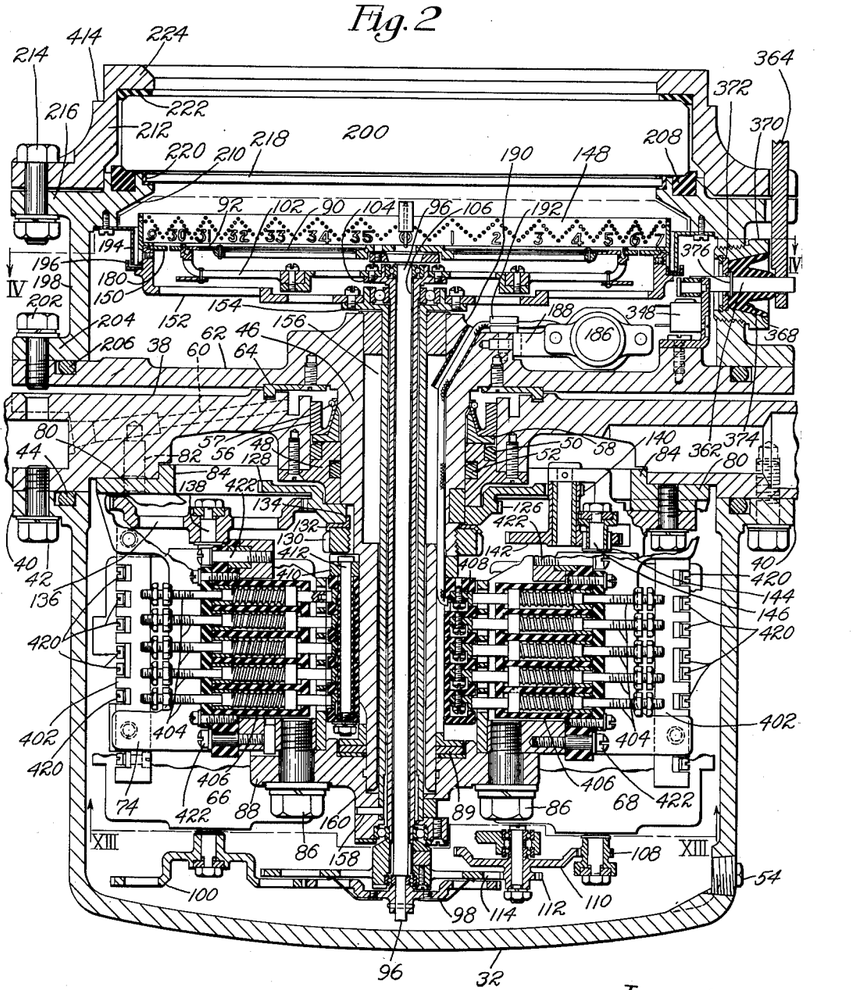
Fig. 2 is a sectional elevation taken in a plane common to the vertical axis of the pelorus illustrating the bearing transmitting mechanism and other parts associated therewith, certain parts being transposed from their actual positions for convenience of illustration.

Referring to Fig. 2, the illustrated housing 32 is provided with a head 38 secured to an outwardly extending flange 40 of the housing by screws 42, the joint between the head and the housing being sealed against water under pressure by a cylindrical gasket 44 positioned in a groove in the housing, a cylindrical opening being provided in the central portion of the head 38 for the hub 46 of the pelorus. A cylindrical member 48 providing a bearing for the hub 46 is secured to the head 38. A gasket 50 mounted in a rabbet in the upper portion of the bearing member 48 seals the joint between said bearing member and the head and a ring 52 mounted in a groove in the cylindrical surface of the bearing member 48 presses against the hub 46 of the pelorus and resists the passage of water under pressure through the bearing into the interior of the housing. The ring and the gasket above referred to are made of a resilient substance and are in each case of a diameter substantially greater than the depth of the recesses in which they are contained and, therefore, exert a continuing pressure against the surfaces upon which water might seep through into the interior of the housing. For periodic checking to determine whether water has seeped into the housing, a suitable opening is provided in the cylindrical wall of the housing near its base and a screw plug 54 is provided for closing said opening. For assisting the ring 52 in resisting the passage of water through the bearing member 48 a sealing ring 56 is mounted on the hub 46 above the member 48, filling the space provided therefor between the cylindrical opening in the head 38 and the hub. Said sealing ring is characterized by a relatively thin inner portion frusto-conical in shape and grooved near its upper edge to receive an endless tension spring 57 which presses its upper margin against a portion of the hub of slightly increased diameter. The ring 56 is supported by a complementally shaped ring 58 which rests on the member 48. In order to provide some protection for the spring 57 against corrosion the space above the ring 56 is filled with grease which is forced into said space through a bore 60 extending from the outer edge face of the head 38. A similar bore (not shown) extending from the grease cavity to the opposite side of head 38 serves as a vent during introduction of grease in said cavity and also permits the expulsion of grease in the cavity by the operation of a grease gun. The outer portion of the bore 60 is counterbored to receive a plug for sealing the bore against water under pressure and the opposite bore is sealed in the same manner. In order to provide a base for the pelorus the hub 46 has formed therein a wide flange 62 extending outwardly to the extreme limits of the pelorus. For resisting the passage of foreign matter into the grease filled cavity above referred to an annular flanged plate 64 is secured to the bottom surface of the base 62 with its downwardly extending flange positioned within a circular groove in the head 38.

Figure 13:
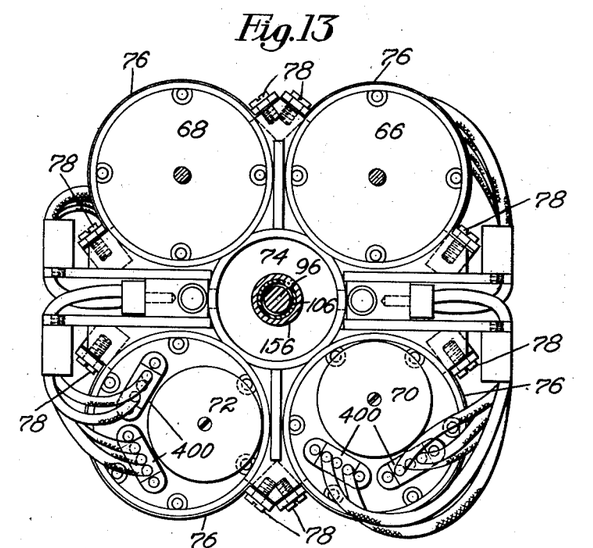
Fig. 13 is a section on the line XIII—XIII of Fig. 2.

The two synchronous motors and the two synchronous generators enclosed by the housing 32 are illustrated in Fig. 13 in which the numerals 66 and 68 identify the two motors, respectively, which actuate the compass dials in the pelorus, the numeral 66 indicating the motor in the 1:1 "selsyn" system and the numeral 68 indicating the motor in the 36:1 system. The numerals 70 and 72 indicate the two generators, respectively, which transmit the angular movement of the pelorus to the control room, the numeral 70 indicating the generator in the 1:1 system and the numeral 72 indicating the generator in the 36:1 system. The motors 66 and 68 and the generators 70 and 72 are rigidly secured to a frame or spider 74 divided into quadrants each of which is provided with a recess complemental in shape to said motors and generators which are rigidly secured in said recesses by metallic straps 76 having outwardly flanged ends which are secured to the extremities of the legs of the spider by screws 78. Referring again to Fig. 2, the upper portion of the spider 74 is in the form of an annular portion 80 through which extend a plurality of headed screws, one of which is shown at 82, for securing the spider to the head 38 of the housing. For centering the spider in the housing the annular portion 80 has an upwardly extending flange 84 which is seated in a complementally shaped recess or rabbet in the head 38. Secured to the base of the spider 74 by means of headed screws 86 is a plate 88 which provides a bearing for the lower portion of the hub 46 of the pelorus and provides also a mounting for washers 89 which support the weight of the pelorus.

Figure 4:
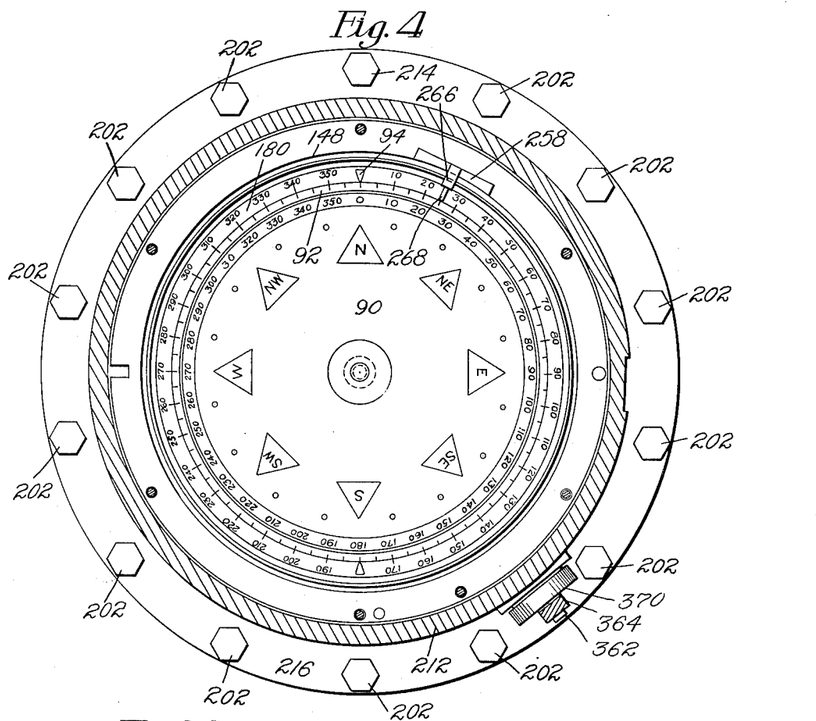
Fig. 4 is a section on the line IV—IV of Fig. 2.

The motor 66 causes the rotation of a compass dial 90 (Figs. 2 and 4) enclosed in the base of the pelorus, and the motor 68 causes the rotation of an annular dial 92 mounted in concentric relation to the dial 90. It will be seen that the dial 90 is discoidal in shape and is marked to indicate the points of the compass and also has inscribed on its margin numerals indicating degrees of angulation from a zero position coinciding with a pointer on the dial indicating north. The course of the submarine is indicated by a pointer 94 fixed on the lubber line of the submarine. The annular dial 92 is marked similarly to the margin of the dial 90 to indicate the degrees of angulation from the zero or north position. The annular dial is read with reference to the numerals on the dial 90. In general the two dials turn at the same rate of speed, the center dial 90 operated by the motor 66 in the 1:1 system providing a coarse reading of the compass bearing while the annular dial 92 operated by the motor 68 in the 36:1 system provides a fine reading of the compass bearing which corrects any slight inaccuracies caused by lag or overthrow in the 1:1 system. Referring again to Fig. 2 the dial 90 is secured to the upper end of a stem 96 positioned concentrically in the hub 46 of the pelorus. Secured to the lower end of the stem 96 is a spur gear 98 which meshes with a similar gear 100 fixed to the shaft of the motor 66. The annular compass dial 92 is secured to the upturned end portions of the legs of a spider 102 secured to the head 104 of a sleeve 106 surrounding the stem 96. The sleeve 106 is rotated by the motor 68 of the 36:1 system through suitable reduction gearing comprising a small gear 108 on the motor shaft arranged to mesh with a large intermediate gear 110 which is formed integrally with a small gear 112 arranged to mesh with a large gear 114 fixed to the lower portion of the sleeve 106.

The angular movement in azimuth of the binoculars is transmitted to the control room of the submarine by the two "selsyn" systems including, respectively, the generators 70 and 72. Referring to Fig. 2 there is mounted on the hub 46 of the pelorus a unit comprising two spur gears 126 and 128 mounted on a common hub, said unit being clamped against a shoulder formed in the hub 46 by a clamping nut 130 which bears against an annular plate or key 132 having an upturned tab 134 inserted into a groove in the hub of the gear unit and downturned tabs seated in notches in the nut 130. The small gear 126 meshes with a gear 136 of the same size fixed to the shaft 138 of the generator 70 (not shown in Fig. 2). The large gear 128 actuates the generator 72 (not shown in Fig. 2) of the 36:1 system. Said gear 128 meshes with a small intermediate gear 140 which has integrally formed therewith a large gear 142 which meshes with a small gear 144 fixed to the shaft 146 of the generator 72.

To enable the observer to determine the angle of the line of sight of the binoculars relatively to the lubber line of the submarine a cylindrical dial 148 is secured to the upwardly extending flange or rim 150 of a fixed spider 152 having a round central opening which provides for the mounting of said member on the head 154 of a sleeve 156 surrounding the sleeve 106. The dial 148 (Fig. 9) has punched out numerals indicating in units of ten degrees the measure of angular movement of the pelorus. The dial is so oriented that the zero coincides with the lubber line of the submarine, the dial being secured in said position by locking means at the lower extremity of the sleeve 156 (Fig. 2) comprising a pin 158 extending through a downwardly projecting hub 160 of the plate 88 fixed to the base of the spider 74 and into a bore in the lower extremity of said sleeve 156. The dial 148 (Fig. 9) has punched out lines of perforations uniformly spaced about the dial, the distance between any two adjacent perforations measuring one degree of angular movement of the pelorus. To facilitate the reading of the dial said perforations are arranged in alternately descending and ascending lines, the top perforation in each ascending line being identified by a punched out numeral and the bottom perforation in each descending line indicating the five degree point between adjacent numerals.

Figure 14:
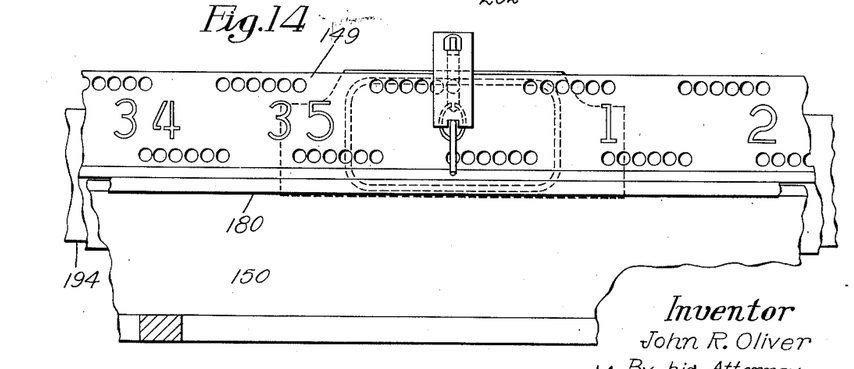
Fig. 14 is an enlarged view similar to Fig. 9 showing an alternative dial construction.

In Fig. 14 there is illustrated an alternative cylindrical dial 149 characterized by a modification of the arrangement of the perforations for measuring in units of one degree the relative angular position of the pelorus. In the dial 149 the perforations are arranged in groups of six perforations each positioned alternately above and below the punched out numerals. In each case the group of perforations forms a straight line parallel to the edges of the dial plate. In each upper line the perforation at the left end of the line is identified by a punched out numeral and the perforation at the right end of the line indicates the five degree point between adjacent numerals. Conversely, in each lower line the perforation at the left end of the line indicates the five degree point while the perforation at the right end of the line is identified by a punched out numeral. It will be seen that this arrangement of the numerals and perforations serves to facilitate a quick and accurate reading of the dial.

Figure 9:
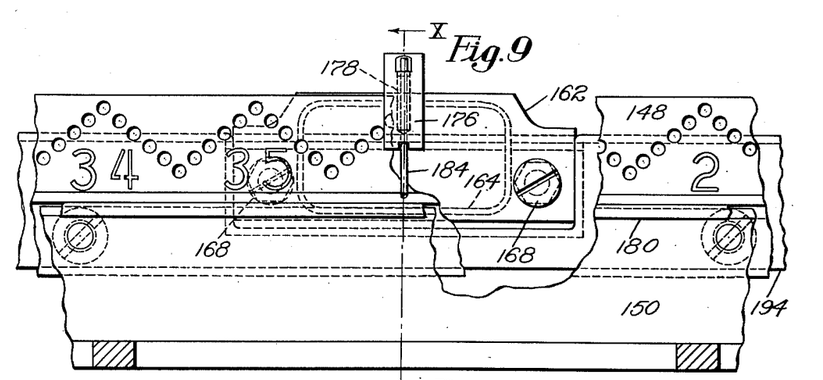
Fig. 9 is an enlarged view illustrating the dial on which the observer reads the relative bearing, and certain associated parts.
Figure 10:
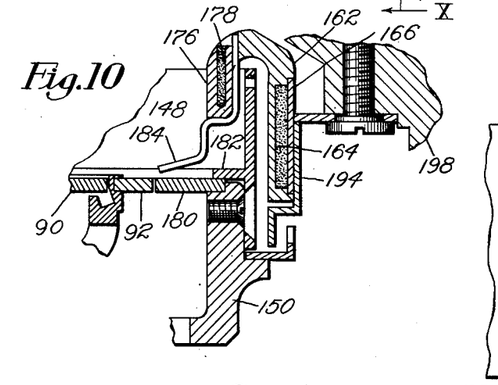
Fig. 10 is a section on the line X—X of Fig. 9.

Referring now to Fig. 9, the relative angle of the line of sight of the binoculars is indicated on the dial 148 by an indicator or pointer fixed to the pelorus and located within and adjacent to the dial. In order that readings may be taken, either by day or by night, the illustrated indicator includes a self luminous pointer which has the appearance of an illuminated vertical line by night and appears as a white line by day. To provide a contrasting background to facilitate readings in daylight the dial is made black. To make the punched out numerals and measurement holes visible by night a self luminous element associated with the pointer is positioned outside of and adjacent to the dial. Referring to Figs. 9 and 10, the illustrated indicating assembly comprises a plate 162 positioned outside of and parallel to the dial 148 and substantially adjacent thereto. The plate is made of a transparent substance and has a generally rectangular recess 164 opening away from the dial 148, said recess being filled with a suitable luminous substance such, for example, as a mineral salt activated by a small percentage of radium, said luminous substance being retained within the recess by a cover plate 166 adhesively sealed to the plate 162. The plate 162 is secured to an angle plate 194 fixed to the pelorus. The plate 162 has a central arm 176 which, as shown in Fig. 10, extends in an arm over the upper edge of the dial 148 and then downwardly in a straight line approximately halfway to the base of the dial. A vertical socket 178 of small diameter is formed in the straight portion of the arm 176 and filled with a luminous substance, preferably of considerably higher luminosity than the substance in the recess 164, said substance providing a relatively thin vertical line which serves as a pointer. It will be understood that the indicating unit is so positioned on the pelorus that the luminous pointer lies in a vertical plane common to the line of sight of the binoculars and therefore serves to point out on the dial 148 the angular position of said line of sight relatively to the lubber line of the submarine. Under certain circumstances it is more convenient to read the relative angle of the line of sight of the binoculars from a flat horizontal dial rather than from a cylindrical dial such as the dial 148. Accordingly, the pelorus is provided with an alternative dial in the form of an annular plate or ring 180 (Figs. 4 and 10) the upper surface of which is marked to indicate degrees of angulation. The dial 180 is mounted in a recess or rabbet in the flange 150 of the spider 152 and is held against upward movement by an annular flange 182 projecting inwardly from the cylindrical dial 148. A pointer for indicating on the dial 180 the relative angular position of the binoculars is incorporated in the curved arm 176 (Fig. 10) and identified by the numeral 184.

For illuminating the dial 180 and also the two compass dials 90 and 92 a plurality of electrically illuminated lamps are mounted in the space immediately below the spider 152, one of said lamps being indicated by the numeral 186 in Fig. 2. Said lamp is mounted in a bracket having a reduced extension 188 which is seated in a recess in an upward extension 190 of the hub of the pelorus and secured therein by a headed screw 192 extending through an opening in the extension 188 of the lamp bracket. The lamps are uniformly spaced about the hub of the pelorus so as to provide substantially uniform illumination for the dials. The light from the lamps shines upwardly between the legs of the dial supporting spiders and through the dials themselves which are made of a translucent material. Suitable shields are provided for preventing the passage of light from said lamps except through the dials themselves as above described. Said shields comprise a circular angle plate 194 secured to the pelorus and a circular channel plate 196 secured to the ring 150 and arranged to receive the downwardly extending portion of the plate 194. A rheostat (not shown) is provided for varying the candlepower of the lamps 186 so that only the minimum requirement of light passes upwardly through the dials. Means is also provided for extinguishing said lamps when it is necessary to provide total darkness on the deck of the submarine, as when enemy aircraft are operating in the vicinity of the submarine.

The various dials and other parts in their immediate vicinity, including the lamps 186, are contained within a watertight closure in the base of the pelorus, said closure comprising the base plate 62 extending outwardly from the hub 46 of the pelorus, a cylindrical member 198 providing the peripheral wall of the closure and a thick glass window 200 discoidal in shape providing the top of said closure. The cylindrical member 198 is secured to the plate 64 by headed screws 202 extending through a flange 204 projecting outwardly from said cylindrical member, a resilient cylindrical gasket 206 being inteposed between the flange 204 and plate 64 and mounted in a circular groove in the plate 64 substantially less in depth than the diameter of the gasket. The window 200 is mounted on a relatively thick resilient gasket 208 seated in and projecting upwardly from a circular groove in an inward extension 210 of the cylindrical member 198. The window 200 is clamped against the gasket 208 under substantial pressure by a circular member or bezel ring 212 secured by bolts 214 to an outwardly extending flange 216 of the cylindrical member 198, a suitable gasket 222 being interposed between an inwardly extending flange 224 of the bezel ring and the margin of the top surface of the window. In order to prevent condensation of moisture on the inner or bottom surface of the window 200 due to differences in temperature in and out of the enclosure in the base of the pelorus, a relatively thin transparent plate 218 is mounted in a recess or rabbet in the inward extension 210 of the cylindrical member 198 and spaced slightly from the bottom surface of the window 200 by a resilient circular channel member 220 mounted on the margin of said transparent member. It will be understood that the provision of the window 200 in the pelorus enables the observer to read the dials mounted within the enclosure.

Figure 3:
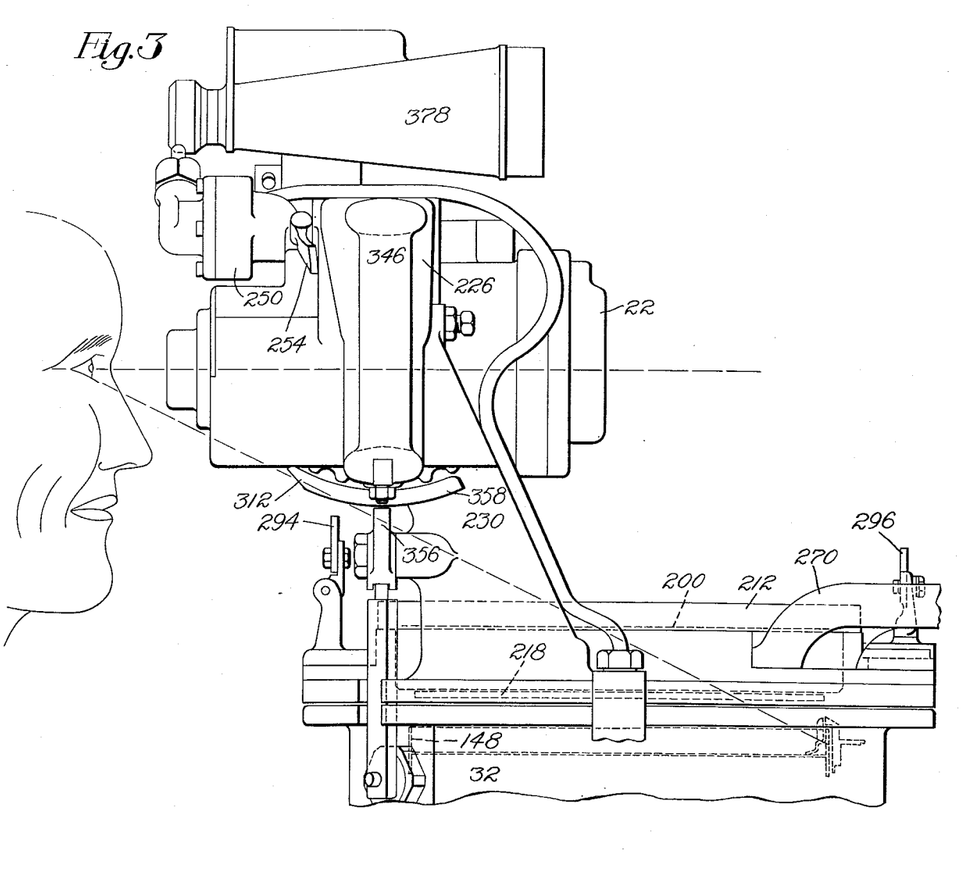
Fig. 3 is a side elevation of the pelorus illustrating particularly the position of the permanently mounted sighting instrument relatively to the dial on which the observer reads the angular position of the line of sight of the instrument.

Referring to Figs. 1 and 3 the binoculars 22 are suspended from a crosshead or hanger 226 having downturned end portions 227 which are pivotally mounted on headed pins 228 projecting outwardly from two brackets or standards 230 projecting upwardly from the bezel ring 212. The binoculars are mounted on the enlarged central portion 231 of the hanger 226 by a hinge pin 232, the binoculars being held against movement in the direction of the line of sight by so arranging them that the central portion 231 of the hanger is fitted into the space between the forward and rearward hinges of the binoculars. The right barrel of the binoculars is rigidly clamped to the hanger 226 by a flexible band 234 one end of which is anchored to a pin 236 mounted in the central portion 231 of the hanger and the other end of which is anchored to the head of a bolt 238 extending upwardly through the hanger, a nut 240 being provided on the exposed end portion of the bolt 238 to permit the flexible band 234 to be drawn tightly about the right barrel of the binoculars. The band 234 clamps said right barrel against a downward extension 242 of the hanger and so locates the binoculars that their eye pieces are positioned at substantially the same elevation. To provide for interpupillary adjustment of the eye pieces the left barrel of the binoculars is mounted to swing on the hinge pin 232 and a right and left threaded screw 244 is mounted for turning movement in suitably threaded holes extending diametrically through two cylindrical pins 246 mounted to turn in lugs 248 projecting downwardly from the respective barrels of the binoculars. To enable the observer to locate the target in the horizontal center of the field of vision of the binoculars, a reticle of known construction is provided in the rigidly mounted barrel of the binoculars. The reticle, which is not shown in the drawings, is a vertical line on a transparent plate mounted between the lenses of the binocular. In order to illuminate the recticle to enable the observer to make use of it in total darkness, an electrically illuminated lamp is mounted in a suitable fixture 250, hinged on a bracket 252 projecting upwardly with an outward inclination from the rigidly mounted binocular barrel. A suitable glass plate mounted in the binocular barrel permits the passage of light from said lamp into the interior of the barrel. The lamp is controlled by a switch mounted on the fixture 250, and a thumb lever 254 is conveniently arranged for operating said switch. A current of electricity is conducted to the lamp from within the submarine through conducting means hereinafter described.

Referring to Fig. 3, the standards 230 are arranged to incline toward the observer in order to position the eye pieces of the binoculars, so that the observer, without any appreciable bodily movement of his head, may direct his line of vision either through the binoculars or toward the cylindrical dial 148. The facility thus afforded for alternately observing the target and reading the angular bearing of the line of sight of the binoculars is of great importance, when the submarine is operating within the firing range of the target, since under such circumstances the observer must act with the utmost speed to take successive bearings of the target and compute therefrom the correct position of the submarine for firing, so that the submarine will be on the surface, exposed to enemy fire, only a minimum period of time. In Fig. 3, the broken lines indicate the line of vision of the observer through the binoculars and in the direction of the cylindrical dial 148. It will be seen that, when the observer's head is in the position indicated in Fig. 3, the eye piece of the binoculars does not obstruct his view of the dial 148, and the main portions of the binocular barrels, being offset outwardly from the eye pieces (Fig. 1), do not present any additional obstruction to his view of said dial. In order to counterbalance the weight of the binoculars and the mechanism associated therewith, two arms, one of which is partially shown in Fig. 3 and identified by the numeral 270, project upwardly and rearwardly from the bezel ring 212, and carry at their outer ends a counterweight (not shown) which prevents the binocular mount from swinging the suspended assembly into an out-of-plumb position.

Figure 5:
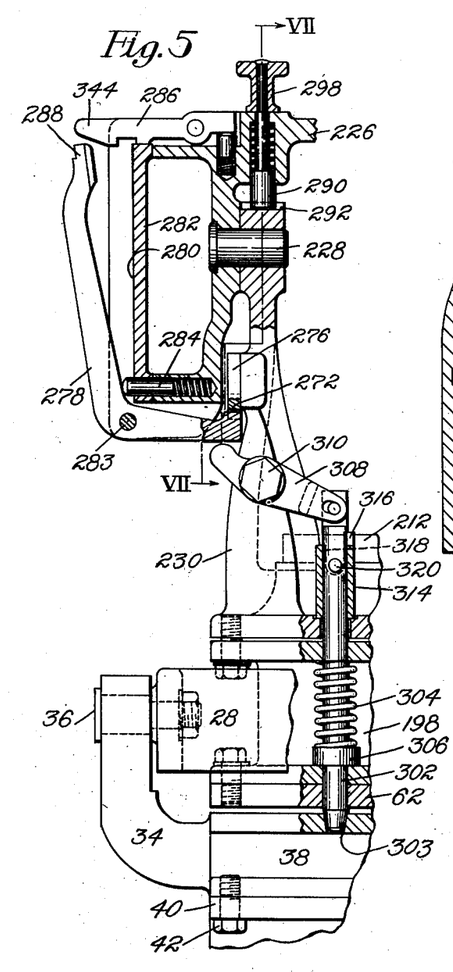
Fig. 5 is a front elevation partly in section in a plane common to the horizontal axis of the pelorus illustrating mechanism for locking the pelorus against movements in azimuth and in elevation.
Figure 7:
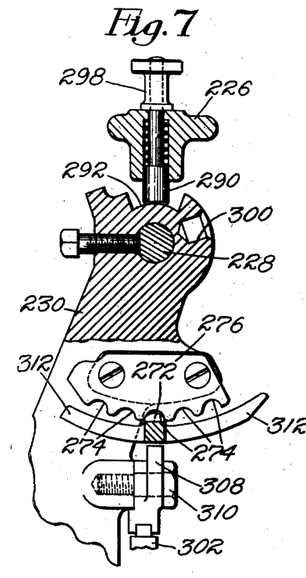
Fig. 7 is a section on the line VII—VII of Fig. 5.

Before the observer goes below, he is required to take the necessary steps to lock the binoculars against movement relatively to the standards 230, and to lock the pelorus against movement on its vertical axis and also against rocking movement on its gimbal bearings. To this end, the illustrated pelorus is provided with locking devices, so constructed and arranged that a simple direct movement of each hand effects the locking of the movable parts, with no appreciable expenditure of time. Referring to Figs. 1, 5 and 7, the illustrated mechanism for locking the binoculars against movement in elevation comprises a detent 272 (Fig. 7), arranged for locking engagement in any one of a plurality of curved notches 274 in a plate 276 secured to the standard 230. The detent is incorporated in the horizontal portion of an angular arm 278 (Fig. 5) mounted in a recess or channel 280 in a left-hand grip 282 incorporated in the hanger 226 and pivoted at its elbow on a pin 283 in said grip. The angular arm 278 is so constructed and arranged that its upwardly extending portion is divergently positioned relatively to the hand grip 282 when the detent 272 is in its locking position illustrated in Fig. 5, and is yieldingly held in that position by a spring pressed plunger 284. To release the detent 272 to free the binoculars for movement in elevation, the observer merely closes his left hand upon the hand grip 282 and the arm 278 to bring said arm into its position shown in Fig. 1. In order to prevent a continuing pressure of the arm 278 against the hand of the observer by the pressure of the plunger 284, a latch 286 is pivotally mounted in the upper portion of the hand grip 282 and arranged to engage the reduced upper end portion 288 of the arm 278. In taking the necessary steps for the locking of the binocular mount, the observer need not bring the binoculars into a horizontal position, since the provision in the plate 276 of a plurality of notches 274 (Fig. 7) for the detent 272 ensures the locking of the binoculars against movement in elevation, whatever its position in elevation may be when the latch 286 is released. In order to limit the movement of the binoculars in elevation to the range afforded by the extent of the series of notches 274, a spring pressed stop pin 290 is mounted in a suitable counterbore in the hanger 226 and seated in a notch 292 in the upper end portion of the standard 230, the end walls of said notch serving as abutments to limit the swinging movement of the hanger on the pin 228. When sighting nearby objects, it is often desirable to use the sight vanes 294 and 296, illustrated in Fig. 3, instead of the binoculars, and under such circumstances it may be desirable to swing the binoculars into a remote position. To this end the stop pin 290 is preferably retractable to permit movement of the binocular mount beyond the range afforded by the notch 292. As illustrated in Fig. 7, the stop pin is a headed spring pressed member, the upper portion of which is extended to provide a mounting for a knob 298, whereby the pin may be retracted sufficiently to enable the binocular mount to be moved beyond its normal range of adjustment in elevation and into a position in which said pin enters a socket 300 in the standard 230 to hold the binocular mount in its remote position. Referring to Fig. 5, the pelorus is locked against angular movement about its vertical axis by a spring-pressed pin or plunger 302 mounted in holes provided in the outwardly flanged portions of the bezel ring 212 and the cylindrical portion 198 of the base of the pelorus and arranged to be seated in a socket 303 provided in the outwardly flanged portion of the head 38 of the housing. A spring 304, surrounding the plunger 302 and acting against the upper flange of the cylindrical member 198, presses against a collar 306 on the plunger 302 yieldingly holding the plunger in its socket. The plunger 302 is retracted by the operation of the angular arm 278, which, in this instance, serves as a bell crank lever to operate a rocker arm 308 pivotally mounted on a headed pin 310 projecting forwardly from the standard 230, said rocker arm having a pin and slot connection to the upper end portion of said plunger. In order that the arm 278 may engage and actuate the rocker arm 308 in any position of the binocular mount within its normal range of movement, the arm 278 is provided with arcuate extensions 312 (Fig. 7) for engagement with said rocker arm. When the pelorus is being operated with the binoculars in their remote position determined by the engagement of the stop pin 290 in its socket 300, the arcuate extensions 312 of the arm 278 are out of registration with the rocker arm 308, and therefore are ineffective to hold the plunger 302 out of locking position. In order that the plunger may be held retracted when the binoculars are in said remote position, an auxiliary retaining means is provided in the form of a sleeve 314 (Fig. 5). In its upper portion the sleeve 314 is provided with two pairs of notches 316 and 318, the notches of each pair being oppositely positioned in the upper portion of said sleeve. The plunger 302 is provided with a crosspin 320, which is seated in the notches 316 when the sleeve is turned to bring said notches into registration with the crosspin, the engagement of said crosspin in the notches serving to retain the plunger 302 in retracted position. When the sleeve is in its position illustrated in Fig. 5, the crosspin 320 registers with the notches 318, which merely provide clearance for the movement of the crosspin during the locking movement of the plunger. For turning the sleeve a handle 321 (Fig. 1) projects radially therefrom.

Figure 6:
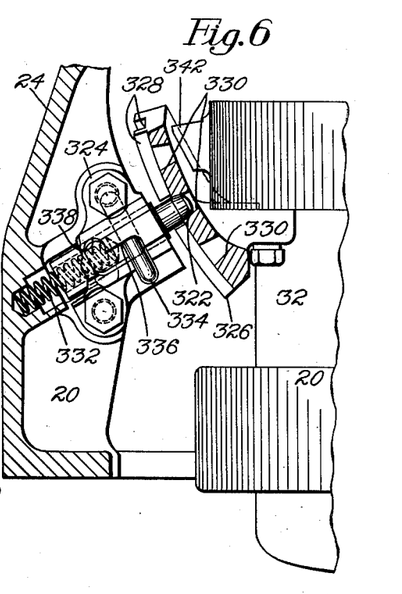
Fig. 6 is a side elevation partly in section on the line VI—VI of Fig. 1 illustrating mechanism for locking the pelorus against rocking movements on its gimbal bearings.

For locking the entire movable assembly comprising the housing 32 and the pelorus against rocking movement on the gimbal bearings 30 and 36 (Fig. 1) a locking pin or plunger 322 (Figs. 1 and 6) is mounted in a bracket 324 projecting inwardly and upwardly from the standard 24 and arranged to enter any one of a plurality of sockets 330 in a bracket 326 secured to the upper portion of the housing 32. The forward surface of said bracket 326 is convex in shape, the contour of said surface being such that the distance from the bracket 324 to the bracket 326 is constant in any and all positions of the housing 32. In order that the plunger 322 may quickly come into registration with one of the sockets 330 during the normal rocking movements of the assembly in the course of the submerging of the submarine, a system of intersecting grooves 327 and 328 is provided in the convex surface of the bracket 326, the groove 327 being in the shape of an arc struck from the center of the trunnion 30 and the grooves 328, as seen in front elevation in Fig. 1, radiating downwardly from said center. The plunger 322 is bored to receive a spring 332 which urges the plunger into locking position. In releasing the plunger for locking movement the observer cannot take time to bring the plunger into registration with any particular socket or groove in the bracket 326. Consequently the plunger is permitted to contact where it will on the convex surface of the bracket 326 without any prearrangement of the movable assembly by the observer. Ordinarily the plunger will contact the bracket at a high point between the grooves and in the course of the subsequent rocking movements of the assembly the plunger will first enter one of said grooves thereby limiting the assembly to rocking movement about only one gimbal axis and in an instant thereafter the plunger will enter one of the sockets 330 thereby rigidly locking the assembly against further rocking movement. For holding the plunger in a retracted or inoperative position when the binoculars are in use a cross pin 334 is mounted therein. When the plunger is in locking position, as shown in Fig. 6, the cross pin 334 is positioned in opposite slots 336 in the bracket 324 extending longitudinally of the plunger. When the plunger is in its retracted or inoperative position, the cross pin 334 is mounted in slots 338 communicating with and projecting at right angles from the slots 336. To release the plunger for locking action, the observer need only strike one end of the cross pin with his hand to dislodge it from the slots 338. To limit the swinging movement of the assembly on the trunnion pins 30 in order to prevent the bracket 326 from being carried into a position in which it is out of registration with the plunger 322, two stop members or abutments 340 (Fig. 1) are arranged to engage stop surfaces provided in the standard 24. To limit swinging movement of the assembly on the bolts 36 two stop members project outwardly from opposite points in the head of the housing 32, one of said members being indicated by the numeral 342 in Fig. 6. Upward movement of either of said members brings its top surface into engagement with the bottom of the gimbal ring 28 at a point directly beneath the trunnion pin 30.

It will be seen that the observer may quickly and certainly lock the pelorus and the binoculars rigidly against any movement by the force of the sea while the submarine is submerged, this being accomplished preferably by a direct upward movement of the left hand against the outwardly extending tail portion 344 of the latch member 286 and a simultaneous downward movement of the right hand against the outwardly projecting right end portion of the crosspin 334 to enable the spring 332 (Fig. 6) to force the plunger 322 into locking position.

In order to enable the observer to signal the control room as required as, for example, when the line of sight of the binoculars has been brought to bear on the target, there is provided in the illustrated organization a signal transmitting means including mechanism which is the subject of United States Letters Patent No. 2,549,986, granted April 24, 1951, on an application filed in my name, which application was a division of the present application. The illustrated signal transmitting mechanism comprises means for operating a micro-switch 348

Figure 8:
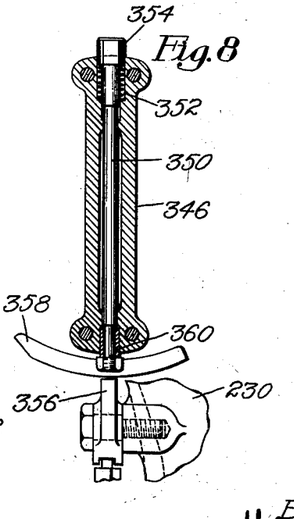
Fig. 8 is a section on the line VIII—VIII of Fig. 1.

(Fig. 2) enclosed in the base of the pelorus. Referring to Figs. 1 and 8, the illustrated mechanism for operating the micro-switch comprises a plunger 350 mounted for vertical movement in the handle 346 and yieldingly held at the limit of its upward movements by a spring 352 surrounding the plunger and confined between the head 354 of the plunger and the base of a counterbore in the handle. Downward movement of plunger 350 by pressure of the thumb of the observer on the head of the plunger rocks a lever 356 pivoted on the standard 230 in a clockwise direction as seen in Fig. 1. In order that the plunger 350 may operate the lever 356 in any position of the hanger 226, within its normal range of rotary movement, afforded by the extent of the notch 292 (Fig. 7) in the left standard 230, the plunger has secured to its reduced lower end portion an arcuate shoe 358 arranged to engage the outer end portion of the lever 356, said shoe being so arranged that the center of its arc coincides with the axis of rotation of the hanger when the plunger is in its position illustrated in Fig. 1. For securing the arcuate member 358 to the plunger said member has an outwardly extending lug 360 which is bored to receive the reduced lower end portion of the plunger, said lug being clamped to a shoulder in the plunger by a nut 361. The lever 356 is connected to a switch operating lever 362 (Fig. 2) by a link 364 pivotally connected to the inner end portion of the lever 356 and bored at its lower end portion to receive the outwardly projecting portion of the lever 362. The upward movement of the link 364 by the operation of the plunger 350 is imparted to the lever 362, the bore in the link being large enough to permit the required operating movement of the lever. The lever 362 is secured in a mounting constructed and arranged to permit rocking movement of the lever sufficient to operate the micro-switch 348 while excluding water under pressure from the closure in the base of the pelorus. As illustrated in Fig. 2 the lever 362 is mounted in a central opening in a resilient rubber ring 368 and is securely bonded thereto to prevent the seepage of water along the joint between the lever and the ring. The frusto-conical peripheral surface of the ring 368 is bonded to the complementally shaped inner wall of a hollow screw plug 370 which is threaded into a suitable opening in the cylindrical base member 198 of the pelorus. The inner end face of the ring 368 bears against an annular abutment plate 372 fixed in the hollow plug 370, said plate serving to take the force of the sea water pressure against the ring when the submarine is submerged. In order to increase the flexibility of the ring 368 it is cut away as indicated at 374 in Fig. 2 in order to reduce to a minimum thickness the inner body portion of the ring while providing a maximum bonding surface of the ring on the lever 362 and the plug 370. In order to prevent accidental operation of the micro-switch by the action of the sea on the exposed mechanism for operating the lever 362 said lever is provided with a peripheral flange 376 and the rubber ring 368 is cut away in the region of said flange so that when the pressure of the sea acts on the exposed end face of the lever 362 there will be a metal to metal contact of the flange with the abutment plate. When the submarine is submerged the pressure of the sea water against the end face of the lever 362 causes the flange 376 embedded in said ring to act against the abutment plate to retain the lever 362 in its horizontal position with the inner end of said lever out of contact with the micro-switch. When the submarine is on the surface the flange 376 is sufficiently separated from the abutment plate 372 by the intervening flange of the ring 368 to permit free movement of the lever 362 within the range required for operation of the micro-switch.

Figure 11:
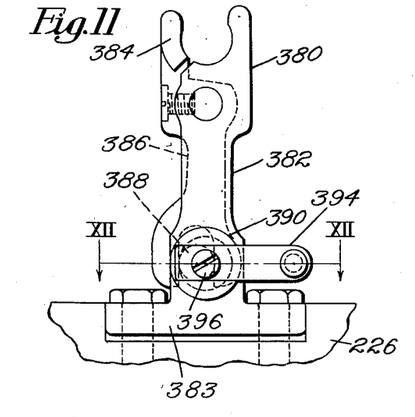
Fig. 11 is an enlarged view of means for mounting a substitute sighting instrument.
Figure 12:
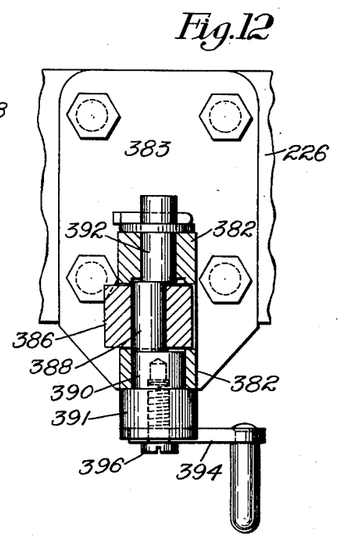
Fig. 12 is a section on the line XII—XII of Fig. 11.

For mounting a pair of hand binoculars, such for example as the binoculars 378, illustrated in Fig. 3, a suitable clamping means is mounted on the hanger 226 and arranged to project upwardly therefrom. Referring to Figs. 11 and 12, the illustrated clamping means comprises a pair of fixed jaws 380 formed in parallel arms 382 projecting upwardly from a plate 383 secured to the hanger, the gripping surfaces of said jaws being arcuate in shape to receive the hinge pin of the binoculars. A single movable jaw 384 is pivotally mounted between the fixed jaws 380 and has a downwardly extending arm 386 which is bifurcated at its lower ends to receive an eccentric 388 projecting from a hub 390 journaled in the base of the forward upright 382. A hub 392 projecting rearwardly from the eccentric is journaled in the base of the rear upright 382. For operating the eccentric in order to open and close the movable jaw 384 a crank 394 is seated in a groove in an enlarged forward portion 391 of the hub 390 and secured therein by a headed screw 396. The eccentric is so constructed and arranged that it comes into a dead center position as the jaws close on the hinge pin of the binoculars and is held in that position by friction until the crank is operated to open the jaws. The jaws are so arranged that the line of sight of the hand binoculars when mounted in said jaws lies in a vertical plane common to the line of sight of the fixed binoculars.

Suitable electrical connections are provided between the deck assembly and the interior of the submarine, said connections being shown in Fig. 1 as two cables 416 and 418 sealed in suitable openings in the head 38 to prevent the seepage of water into the housing. Referring to Fig. 13, wires for conducting electricity from the generators 70 and 72 are connected to terminal blocks 400 in the base of each generator casing and wires for conducting electricity to the motors 66 and 68 are connected to similar terminal blocks (not shown) in the upper portions of the motor casings. Referring to Fig. 2, two separate sets of wires for conducting electricity to the electric elements in the pelorus are secured by binding screws 420 to terminal blocks 402 mounted at opposite sides of the spider 74. Wired to said terminal blocks are brushes 404 mounted in suitable fixtures 406 secured by screws 422 to the spider, said brushes bearing against collector rings, one of which is indicated by the numeral 408, separated from each other by insulating rings, said rings being secured to each other and to a collar 410 fixed to the hub 46 of the pelorus by a plurality of long bolts one of which is indicated by the numeral 412.

In the use of the illustrated apparatus the binoculars 22 are employed for sighting distant targets and the sight vanes 294 and 296 are employed for sighting targets within the observer's range of vision. The binoculars and the sight vanes are also used in conjunction with the compass dials in the pelorus for purposes of navigation. In sighting distant targets or objects the small binoculars 378 are first employed to find the target and after they have been brought to bear on the target the large binoculars are swung into position. When the submarine is beyond the range of enemy fire and sufficient time may be taken for a complete computation of the position of the submarine for firing, the computation is made in the control room from the data transmitted through the "selsyn" system operated by angular movement of the pelorus. When operating within the range of enemy fire the observer himself makes the necessary computation, employing the dial 148 and the luminous indicator to obtain the target bearing. After the observer has completed his computation he gives firing directions to the control room, or alternatively to the torpedo room, through a voice tube communicating with the observer's station on the deck of the submarine.

In the event that the large binoculars 22 are damaged by enemy fire so that they are unusable, the small binoculars 378 are permanently mounted in the grippers provided therefor and used in place of the large binoculars.

It will be understood that the utility of the illustrated apparatus is not limited to the above described use on the deck of a submarine, the apparatus being useful on all types of ships both as a target bearing transmitting means and as an aid to navigation.

Having thus described my invention, what I claim as new and desire to secure by Letters Patent of the United States is:

1. Apparatus comprising a rotor, a first closure embodied in said rotor and constructed to exclude water under pressure, a hub extending from said rotor, a second closure constructed to exclude water under pressure, bearings in said second closure for mounting said hub, said hub having an opening providing a communication from the interior of the first closure to the interior of the second closure, a rotary dial mounted in the first closure, a stem fixed to said dial and extending through the opening in the hub and into the second closure, an electric motor mounted in said second closure, and operating connections from the motor to the stem.

2. Apparatus comprising a rotor, a first closure embodied in said rotor and constructed to exclude water under pressure, a hub extending from said rotor, a second closure constructed to exclude water under pressure, bearings in said second closure for mounting said hub, said hub having an opening providing a communication from the interior of the first closure to the interior of the second closure, a rotary dial mounted in the first closure, a stem fixed to said dial and extending through the opening in the hub and into the second closure, an electric generator mounted in said second closure, and operating connections for transmitting the rotation of the hub of the rotor to said generator.

3. Apparatus comprising a rotor, a first closure embodied in said rotor and constructed to exclude water under pressure, a hub extending from said rotor, a second closure constructed to exclude water under pressure, bearings in said second closure for mounting said hub, said hub having an opening providing a communication from the interior of the first closure to the interior of the second closure, a rotary dial mounted in the first closure, a stem fixed to said dial and extending through the opening in the hub and into the second closure, an electric motor mounted in said second closure, operating connections from the motor to the stem, an electric generator mounted in said second closure, and operating connections from the hub of the rotor to said generator.

JOHN R. OLIVER.

REFERENCES CITED

The following references are of record in the file of this patent:

UNITED STATES PATENTS

| Number | Name | Date |
|---|---|---|
| 151,856 | Croudace | June 9, 1874 |
| 840,923 | Early | Jan. 8, 1907 |
| 918,133 | Ellicott et al. | Apr. 13, 1909 |
| 943,751 | Lewis | Dec. 21, 1909 |
| 1,215,425 | Sperry | Feb. 13, 1917 |
| 1,218,422 | Lietz | Mar. 6, 1917 |
| 1,240,525 | Woodward | Sept. 18, 1917 |
| 1,794,964 | Knutson | Mar. 3, 1931 |
| 1,850,640 | Sperry et al. | Mar. 22, 1932 |
| 1,926,251 | Von Mayrhauser | Sept. 12, 1933 |
| 1,987,680 | Henderson | Jan. 15, 1935 |
| 2,050,808 | Roosenstein | Aug. 11, 1936 |
| 2,099,772 | Seidelhuber | Nov. 23, 1937 |
| 2,248,562 | Andreatta et al. | July 8, 1941 |
| 2,299,179 | Rosenberger | Oct. 20, 1942 |
| 2,365,649 | Shaw | Dec. 19, 1944 |

FOREIGN PATENTS

| Number | Country | Date |
|---|---|---|
| 1,024 | Great Britain | Jan. 14, 1911 |
| 594,563 | France | June 27, 1925 |
| 759,485 | France | Nov. 16, 1933 |